US012663031B2

(12) United States Patent
Oetlinger

(10) Patent No.: US 12,663,031 B2
(45) Date of Patent: Jun. 23, 2026

(54) CONNECTING MECHANISM AND METHOD OF MANUFACTURING

(71) Applicant: Controlled Dynamics, Inc., Grafton, WI (US)

(72) Inventor: Frank Oetlinger, Grafton, WI (US)

(73) Assignee: Controlled Dynamics, Inc., Grafton, WI (US)

( * ) Notice: Subject to any disclaimer, the term of this patent is extended or adjusted under 35 U.S.C. 154(b) by 544 days.

(21) Appl. No.: 18/049,571

(22) Filed: Oct. 25, 2022

(65) Prior Publication Data

US 2024/0131645 A1 Apr. 25, 2024
US 2024/0227098 A9 Jul. 11, 2024

(51) Int. Cl.
*F16B 2/18* (2006.01)
*F16B 2/14* (2006.01)
(Continued)

(52) U.S. Cl.
CPC ............... *F16B 2/185* (2013.01); *F16B 2/14* (2013.01); *F16B 9/05* (2018.08); *B23B 31/1078* (2013.01);
(Continued)

(58) Field of Classification Search
CPC . B23B 31/107; B23B 31/1078; B23Q 1/0072; B25J 9/0009; B25J 15/0408;
(Continued)

(56) References Cited

U.S. PATENT DOCUMENTS 8,066,289 B2 11/2011 Gross et al.
8,500,132 B2 * 8/2013 Norton ................ B23B 31/1071
403/322.2
(Continued)

FOREIGN PATENT DOCUMENTS

CN 202878266 U 4/2013
CN 112497258 A 3/2021
(Continued)

OTHER PUBLICATIONS

Schunk GmbH & Co. Kg, SHS Manual Changing System Assembly and Operating Manual, Aug. 18, 2020, pp. 1-24.

*Primary Examiner* — Josh Skroupa
(74) *Attorney, Agent, or Firm* — Ziolkowski Patent Solutions Group, SC

(57) ABSTRACT

A connecting mechanism includes a first section and a second section engageable with the first section. The second section includes a locking assembly configured to engage a stud with a roller bearing in the first section. That is, the locking assembly is actuatable between a locked state configured to lock the first section to the second section when the first and second sections are engaged and an unlocked state configured to allow the second section to engage with or disengage from the first section. The locking assembly includes a linkage arm engaging a handle and a wedge having a tapered section. The handle is actuatable between a locked position configured to place the locking assembly in the locked state by advancing the tapered section of the wedge and an unlocked position configured to place the locking assembly in the unlocked state by retracting the tapered section of the wedge.

19 Claims, 11 Drawing Sheets

(51) Int. Cl.

| | | |
|---|---|---|
| *F16B 9/00* | (2006.01) | |
| *B23B 31/107* | (2006.01) | |
| *B25J 15/04* | (2006.01) | |

(52) U.S. Cl.
CPC ........ *B25J 15/0425* (2013.01); *Y10T 403/595* (2015.01); *Y10T 403/599* (2015.01); *Y10T 403/7071* (2015.01)

(58) Field of Classification Search
CPC .... B25J 15/0425; E04H 12/2276; F16B 2/06; F16B 2/12; F16B 2/14; F16B 2/18; F16B 2/185; F16B 9/02; F16B 9/05; F16B 21/16; F16B 21/165; Y10S 403/04; Y10T 403/595; Y10T 403/599; Y10T 403/7071
USPC ...................... 403/322.4, 325, 374.5, DIG. 4

See application file for complete search history.

(56) References Cited

U.S. PATENT DOCUMENTS

| | | | | |
|---|---|---|---|---|
| 8,601,667 | B2 * | 12/2013 | Norton | B23Q 1/0072 |
| | | | | 403/322.2 |
| 8,794,418 | B1 * | 8/2014 | Norton | B25J 17/0208 |
| | | | | 74/490.06 |
| 10,047,908 | B1 * | 8/2018 | Bohle, II | B25J 15/0408 |
| 10,105,855 | B2 | 10/2018 | Kalb et al. | |
| 10,843,311 | B2 | 11/2020 | Kirsten et al. | |
| 12,343,831 | B2 * | 7/2025 | Schlüssel | B23Q 1/0072 |
| 2009/0322041 | A1 | 12/2009 | Norton | |
| 2010/0059943 | A1 | 3/2010 | Norton et al. | |
| 2011/0176865 | A1 * | 7/2011 | Colby | F16B 2/18 |
| | | | | 403/324 |
| 2020/0086504 | A1 | 3/2020 | Caron L'Ecuyer et al. | |
| 2020/0306996 | A1 | 10/2020 | Kieffer et al. | |
| 2024/0342927 | A1 * | 10/2024 | Faust | B25J 15/0425 |

FOREIGN PATENT DOCUMENTS

| | | | | | |
|---|---|---|---|---|---|
| DE | 202013003765 | U1 * | 7/2013 | ........ | B23B 31/1072 |
| DE | 202014003715 | U1 * | 5/2014 | ........ | H01L 23/4093 |

* cited by examiner

CONNECTING MECHANISM AND METHOD OF MANUFACTURING

BACKGROUND OF THE INVENTION

Embodiments of the present invention relate to connecting mechanisms and, more particularly, to connecting mechanisms first and second section that are selectively engageable with each other.

Various organization utilize robots in their operations. These operations can vary from a small laboratory with one robot or large factory with dozens of robots or more. These robots may be complex and generally cost-prohibitive to a small organization that does not have much funding. However, at the same time, these robots may be necessary for such small organizations to conduct their operations, whether they be related to research, manufacturing, repairs, and the like.

Further, even when an organization can afford to purchase such robots, the robots must be mounted in a way that is safe for use under various operating conditions. Due to safety concerns, the organization may need to use a mounting method that attaches the robots in its working area in a permanent manner or a manner that would require much effort to undo. For example, a robot may be welded in position and/or attached with many fasteners that would be time-consuming to remove. Thus, these methods of mounting the robots make it difficult to move the robot to another location, if desired.

In addition, these attachment methods typically require regular maintenance checks to ensure that none of the attaching structures are breaking or coming loose. For example, if a robot is mounted with a plurality of fasteners, the organization would need to regularly check whether the fasteners require tightening. If an organization does not perform maintenance checks, it risks the robot coming loose and hurting someone near the robot, damaging equipment or products near the robot, or damaging the robot itself. However, these maintenance checks require the organization to appoint one or more people to schedule and perform the maintenance checks, which increases the cost of owning and using the robot.

It would therefore be desirable to provide a connecting mechanism that allows for easier mounting to a working surface, easier transfer of the object or machine attached to the connecting mechanism, and a strong structure that provides durability and safety during operation.

BRIEF STATEMENT OF THE INVENTION

In accordance with one aspect of the invention, a connecting mechanism includes a first section and a second section engageable with the first section. The first section includes a stud having a roller bearing. The second section includes a housing configured to receive the stud therethrough and a locking assembly positioned within the housing and actuatable between a locked state configured to lock the first section to the second section when the first and second sections are engaged and an unlocked state configured to allow the second section to engage with or disengage from the first section. The locking assembly includes a wedge configured to receive the stud therethrough and including a tapered section, a linkage arm including a first end engaging the wedge and a second end, and a die spring positioned on the linkage arm between the first and second ends thereof. The locking assembly also includes a handle engaging the second end of the linkage arm and the housing and actuatable between a locked position configured to place the locking assembly in the locked state by advancing the tapered section of the wedge to engage the roller bearing of the stud and an unlocked position configured to place the locking assembly in the unlocked state by retracting the tapered section of the wedge.

In accordance with another aspect of the invention, a method of manufacturing a connecting mechanism including a first section and a second section engageable with the first section includes constructing the first section by providing a stud including a roller bearing. The method further includes constructing the second section by providing a housing configured to receive the stud therethrough and assembling, within the housing, a locking assembly actuatable between a locked state configured to lock the first section to the second section when the first and second sections are engaged and an unlocked state configured to allow the second section to engage with or disengage from the first section. Assembling the locking assembly includes engaging, with the housing, a handle configured to actuate between a locked position corresponding to the locked state of the locking assembly and an unlocked position corresponding to the unlocked state of the locking assembly. Furthermore, assembling the locking assembly includes engaging, with the handle, a first end of a linkage arm having a die spring positioned thereon and engaging, with a second end of the linkage arm, a wedge configured to receive the stud therethrough and including a tapered section configured to advance to engage the roller bearing of the stud when the handle is actuated to the locked position and configured to retract when the handle is actuated to the unlocked position.

In accordance with yet another aspect of the invention, a locking assembly for a connecting mechanism includes a wedge configured to receive a stud therethrough and having a tapered section, a linkage arm with a first end configured to engage the wedge and a second end, and a die spring constructed to fit to on the linkage arm between the first and second ends thereof. In addition, the locking assembly includes a handle configured to engage the second end of the linkage arm and actuatable between a locked position configured to place the locking assembly in a locked state by advancing the tapered section of the wedge and an unlocked position configured to place the locking assembly in an unlocked state by retracting the tapered section of the wedge.

These and various other features and advantages of the present invention will be more readily understood from the following detailed description and the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the present invention provide for a connecting mechanism and methods for making the same and for operation thereof. The connecting mechanism includes a first or base section and a second or portable section that is engageable with the base section. The base section includes a housing and a stud mounted within the housing and having a roller bearing. The portable section includes a housing configured to receive the stud therethrough. Within the housing is a locking assembly is configured to lock the base section to the portable section when the base and portable sections are engaged and an unlocked state configured to allow the portable section to engage with or disengage from the base section. The locking assembly includes a wedge configured to receive the stud therethrough and having a tapered section with a forked taper configured to engage roller bearing of the stud. The locking assembly also includes a linkage arm coupling the wedge to a handle that extends through the housing. The handle is actuatable between a locked position configured to place the locking assembly in the locked state by advancing the tapered section of the wedge to engage the roller bearing of the stud and an unlocked position configured to place the locking assembly in the unlocked state by retracting the tapered section of the wedge.

While embodiments of the invention may be described herein with reference to use with robots, those with skill in the art will understand that the concepts disclosed herein may applied to various systems, industries, objects, or machines. As a non-limiting example, the concept of the invention may be applied to a user who wishes to transfer an object attached to a connecting mechanism to different stations to perform different actions on the object.

Figure 1:
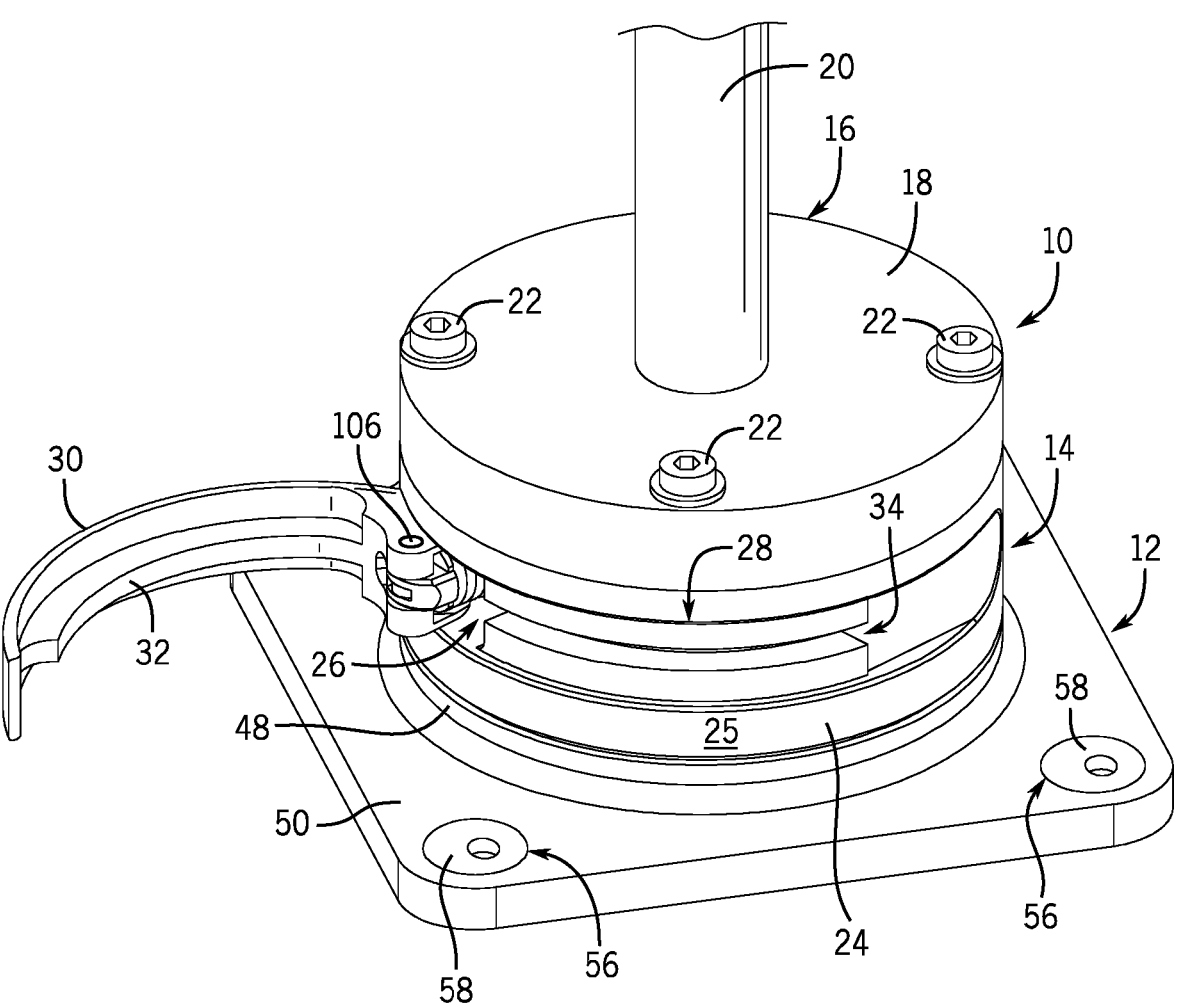
FIGS. 1 and 2 are top perspective views of a connecting mechanism with and without an exemplary object attached thereto, according to an embodiment of the invention.
Figure 2:
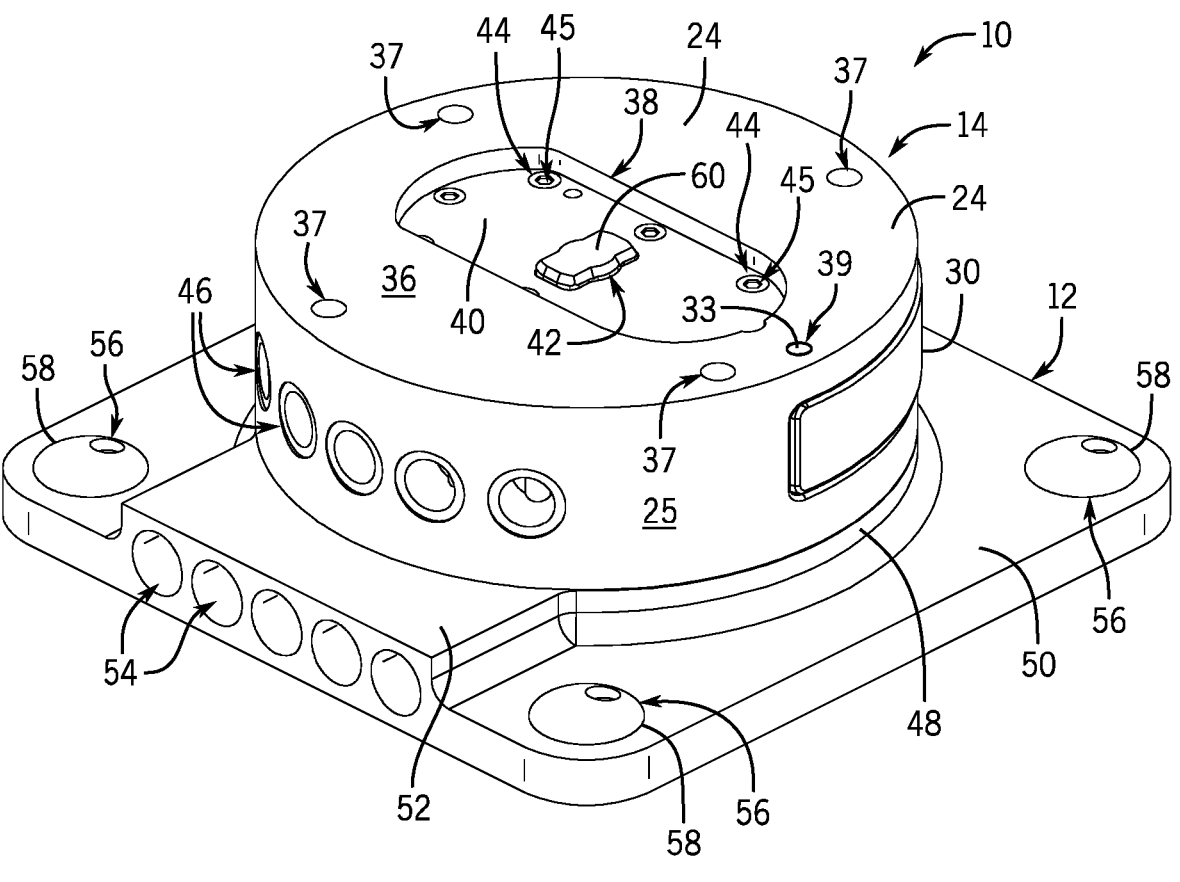

Referring to FIGS. 1 and 2, top perspective views of a connecting mechanism 10 are shown, according to an embodiment of the invention. Connecting mechanism 10 includes a first or base section 12 and a second or portable section 14. FIG. 1 illustrates connecting mechanism 10 with an object 16 including a base plate 18 and a stand 20 coupled to portable section 14, as a non-limiting example. In FIG. 1, base plate 18 of exemplary object 16 is coupled to portable section 14 via a plurality of fasteners 22.

As described in more detail below, connecting mechanism 10 is arranged such that portable section 14 is selectively engageable with base section 12. That is, as shown in FIGS.

1 and 2, portable section 14 may engage with base section 12 and lock in position. Portable section 14 may also be detached from base section 12 while object 16 remains attached thereto such that object 16 may be moved to a different location. As a non-limiting example, portable section 14 and object 16 may be moved to a different base section (not shown) so that a different operation may be performed there. As another non-limiting example, portable section 14 and object 16 may be detached so that object 16 may be temporarily removed to be cleaned in a different area and then brought back for further use.

As shown, portable section 14 includes a housing 24 having a sidewall 25. Sidewall 25 includes a handle opening 26 and a handle recess 28. A lever or handle 30 is positioned within/extends through handle opening 26 and is configured to fit within recess 28. Handle 30 includes an elongated projection 32 extending partially along a length thereof and is engaged with and rotatable with respect to housing 24 via a pin 33 (FIG. 2). Recess 28 includes a groove 34 configured to receive elongated projection 32 of handle 30 such that handle 30 may be flush with sidewall 25 when positioned within recess 28, as shown in FIG. 2. However, when handle 30 is positioned within recess 28, recess 28 still has room for a user to access handle 30 in the area where groove 34 is not present.

Referring to FIG. 2, portable section 14 includes a mounting surface 36 adjacent sidewall 25. In FIG. 1, object 16 is mounted on mounting surface 36 via fasteners 22 extending through fastener openings 37 shown in FIG. 2. While FIGS. 1 and 2 show the use of four fasteners 22 with four faster openings 37, more or less fasteners 22 and fastener openings 37 may be used in various embodiments. Further, fastener openings 37 may be positioned in different locations on mounting surface 36 in various embodiments.

In addition to fastener openings 37, mounting surface 36 includes a main opening or recess 38 and a pin opening 39 for pin 33 engaging handle 30 with housing 24. Within main opening 38 is a cover plate 40 including a stud opening 42 and a plurality of fastener openings 44 and coupled to housing 24 with corresponding fasteners 45. The number and locations of fastener openings 44 and fasteners 45 are exemplary and, therefore, non-limiting.

Sidewall 25 of housing 24 of portable section 14 also includes a plurality of connection openings 46. Connection openings 46 may be used to provide electrical, pneumatic, or other similar types of connections (not shown) to an object or machine mounted on mounting surface 36. These connections may be provided via base section 12.

As shown in FIGS. 1 and 2, base section 12 includes a housing 48 engaged with portable section 14, a mounting surface 50, and a connection section 52 that may be a considered a component of housing 48 or mounting surface 50 in various embodiments. Connection section 52 includes a plurality of connection openings 54 similar to connection openings 46. Connection openings 54 may be configured to receive electrical, pneumatic, or other similar types of connections (not shown) for provision to connection openings 46.

Mounting surface 50 includes a plurality of openings 56 for fasteners 58 to couple base section 12 to a surface independent from that of connecting mechanism 10. In FIGS. 1 and 2, fasteners 58 are shown as angled rivets, but fasteners 58 may be of other types and may be in different location and/or have a different number in various embodiments. In addition to the above, base section 12 also includes a stud 60 extending from housing 48 up through portable section 14, finally extending through stud opening 42 of cover plate 40.

Figure 3:
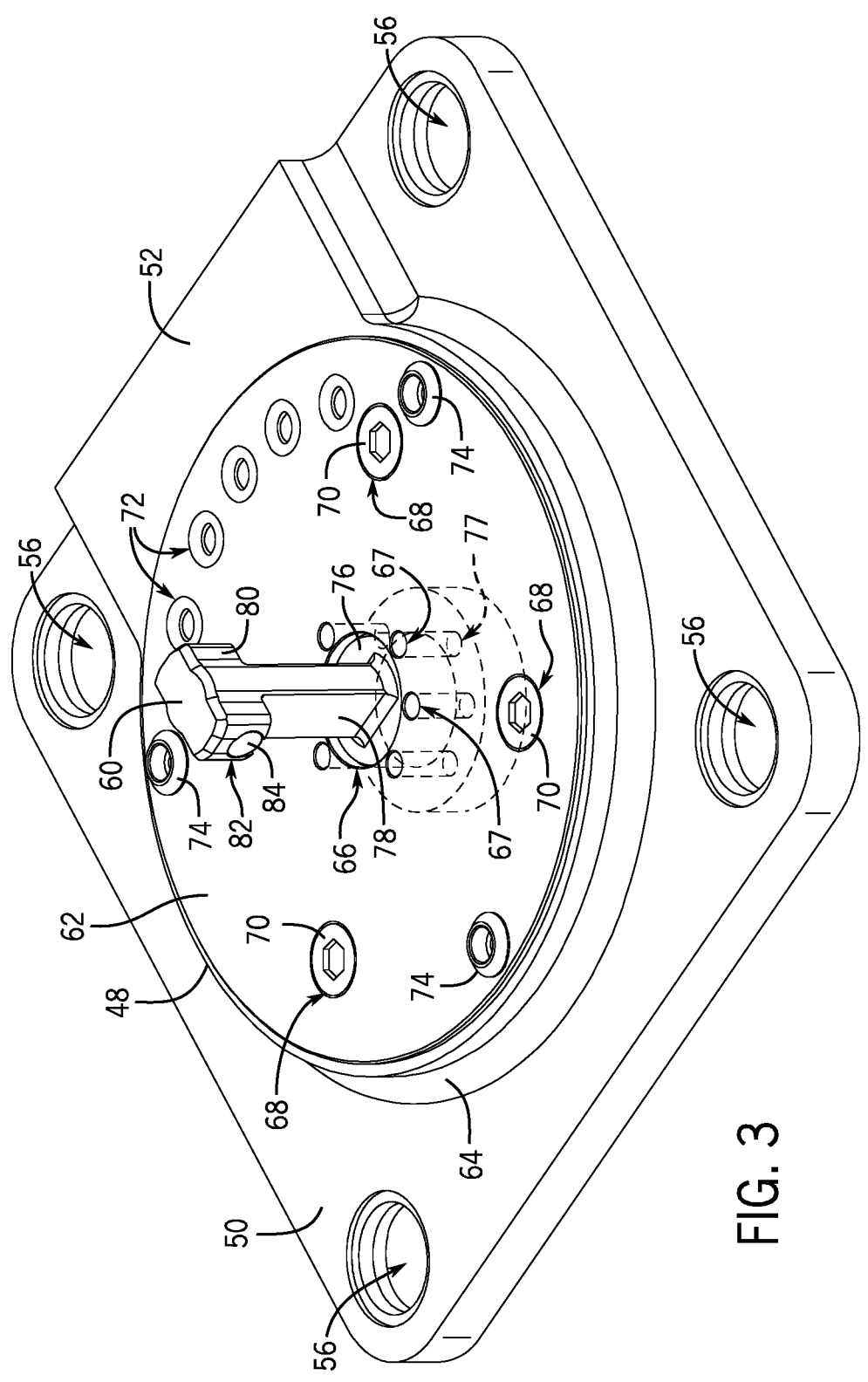
FIG. 3 is a top perspective view of a first or base section of the connecting mechanism of FIGS. 1 and 2, according to an embodiment of the invention.

Referring now to FIG. 3, a top perspective view of base section 12 of the connecting mechanism 10 of FIGS. 1 and 2 is shown, according to an embodiment of the invention. As shown, housing 48 of base section 12 includes a mounting plate 62 and a sidewall 64. Stud 66 is mounted within housing 48 and extends through stud opening 66 in mounting plate 62. Mounting plate 62 may also include optional fastener openings 67 to receive fasteners (not shown) for coupling stud 60 to mounting plate 62.

Mounting plate 62 further includes a plurality of fastener openings 68 for fasteners 70 to aid in fixing mounting plate 62 in position and, in some embodiments, aid in mounting base section 12. That is, in various embodiments, base section 12 may not include mounting surface 50, and may be mounted to an external surface (not shown) via fasteners 70. In addition, mounting plate 62 includes a plurality of connection openings 72 in communication with connection openings 54 in connection section 52 of base section 12 and a plurality of locator projections 74. Locator projections 74 may be used to align portable section 14 with base section 12 when they are engaged with each other.

Figure 8:
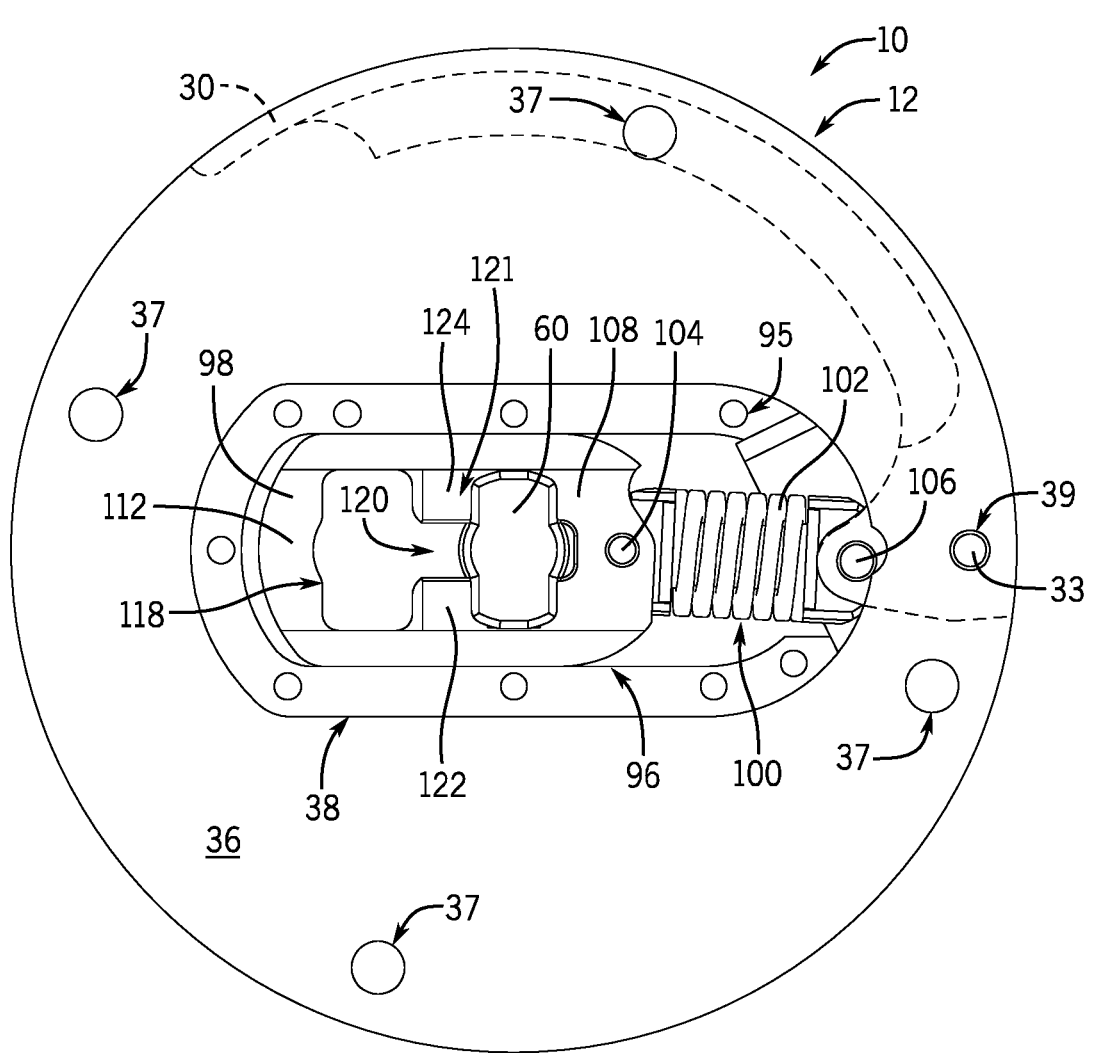

Stud 60 of base section 12 includes a base 76 having a stepped configuration that is also shown in FIG. 8. Base 76 of stud 60 may include a plurality of openings 77 that align with openings 67 in mounting plate 67 for coupling stud 60 to mounting plate 62. Stud 60 further includes a post 78 extending from base 76 to a head 80. Post 78 and head 80 are arranged such that stud 60 has a "T" shape above mounting plate 62. Head 80 includes a roller bearing opening 82 and a roller bearing 84, the operation of which will described in more detail below.

Figure 4:
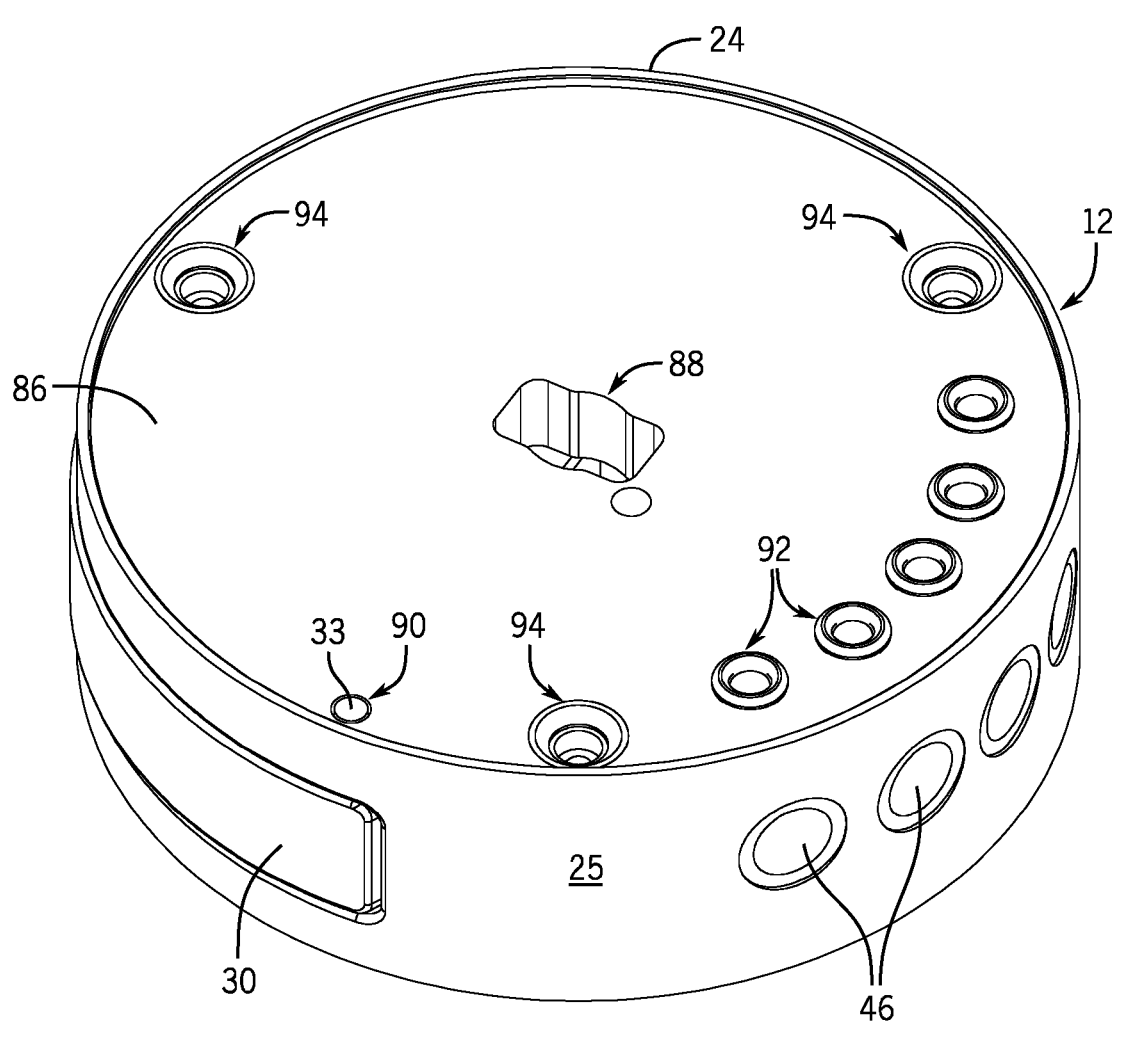
FIG. 4 is a bottom perspective view of a second or portable section of the connecting mechanism of FIGS. 1 and 2, according to an embodiment of the invention.

Referring now to FIG. 4, a bottom perspective view of portable section 14 of connecting mechanism 10 of FIGS. 1 and 2 is shown, according to an embodiment of the invention. FIG. 4 illustrates that housing 24 includes a mounting plate 86 for engaging with mounting plate 62 of base section 12. Mounting plate 86 includes a stud opening 88 for receiving stud 60 therethrough, a pin opening 90 for pin 33, and a plurality of connection openings 92 in communication with connection openings 46 and for communicating with connection openings 72 in mounting plate 62 of base section 12 (FIG. 3). Further, mounting plate 86 includes a plurality of locator receivers 94 that are configured to mate with locator projections 74 in mounting plate 62 of base section 12 (FIG. 3) help with engagement between base and portable sections 12, 14. In various embodiments, the engagement between locator projections and receivers 74, 94 act as a switch to engage connections (not shown) provided through connections openings 54, 72, 92, 46 in base and portable sections 12, 14. Alternatively or in addition, a separate switch (not shown), such as, for example, a push button switch, may be provided on base section 12 or portable section 14 for activation of such connections.

Figure 5:
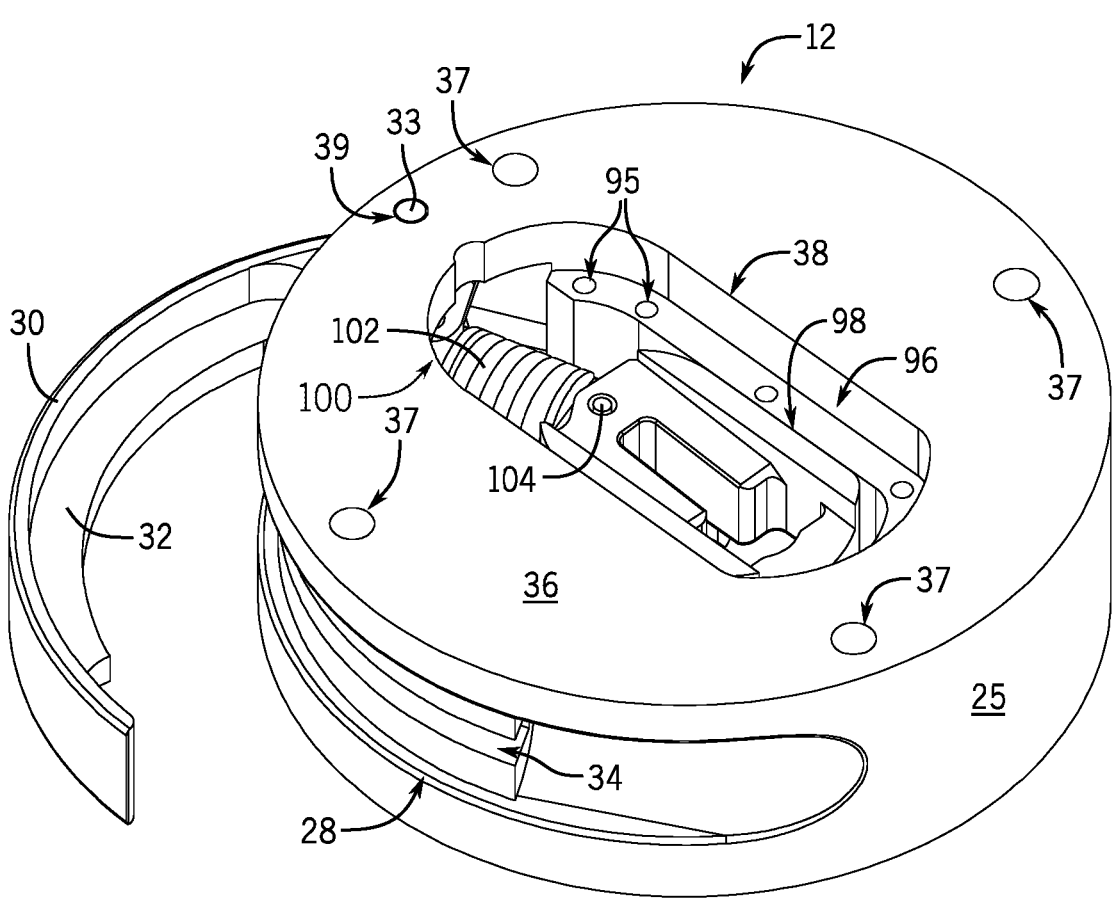
FIG. 5 is a top perspective view of the portable section of the connecting mechanism of FIGS. 1 and 2 without a cover plate, according to an embodiment of the invention.

Referring now to FIG. 5, a top perspective view of portable section 14 of connecting mechanism 10 of FIGS. 1 and 2 without cover plate 40 is shown, according to an embodiment of the invention. As shown, within main opening 38, cover plate 40 is coupled to housing 24 with fasteners 45 via fastener openings 95. Further, FIG. 5 illustrates how portable section 14 includes a locking assembly 96 therein. Locking assembly 96 includes a wedge 98, a linkage arm 100 engaging wedge 98, a die spring 102 positioned on linkage arm 100, and handle 30 engaging linkage arm 100.

Figure 6:
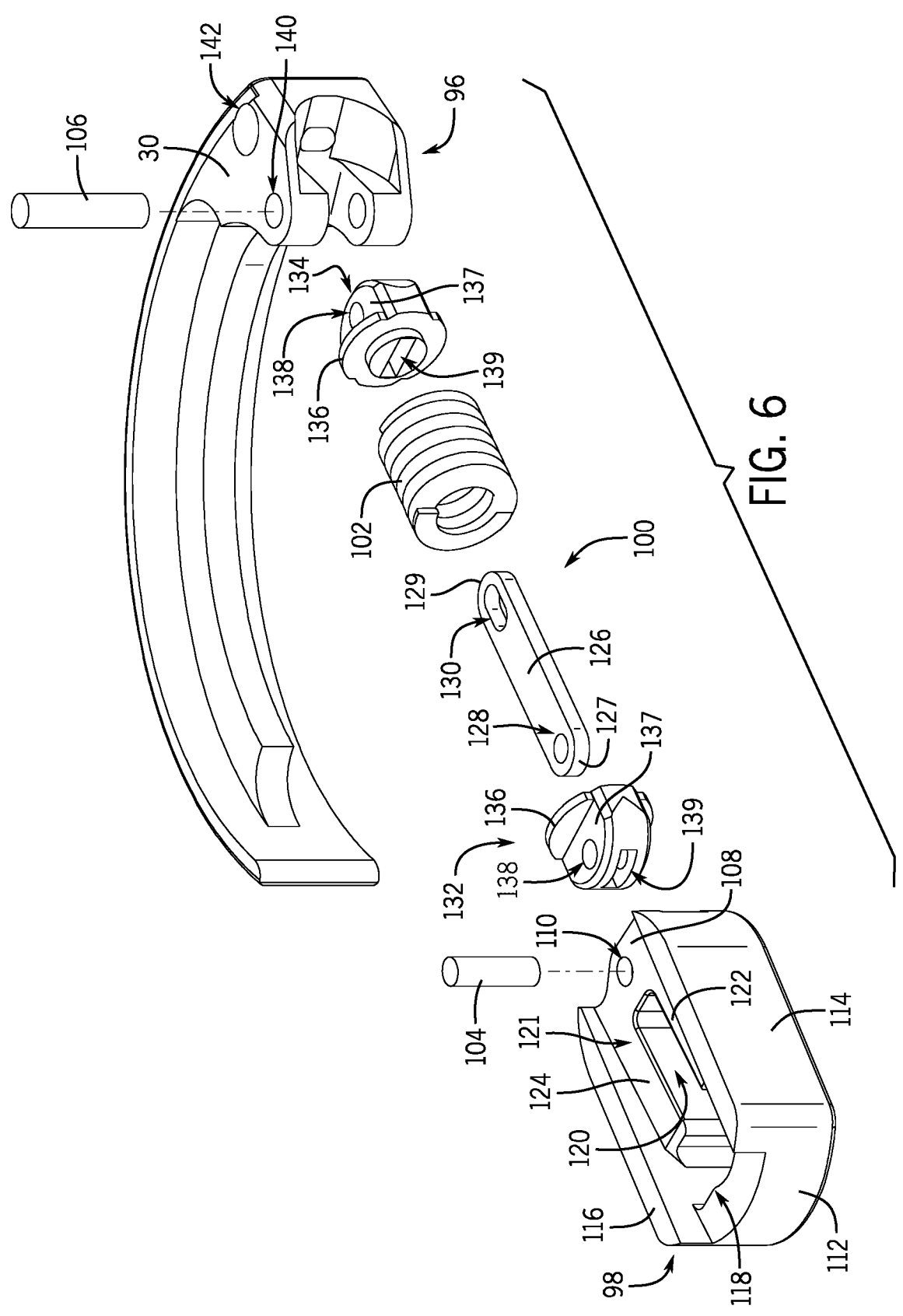
FIG. 6 is an exploded perspective view of a locking assembly of the portable section of the connecting mechanism of FIGS. 1 and 2, according to an embodiment of the invention.

Referring now to FIG. 6, an exploded perspective view of locking assembly 96 of portable section 14 of connecting mechanism 10 of FIGS. 1 and 2 is shown, according to an embodiment of the invention. Initially, linkage arm 100 is engaged with wedge 98 and handle 30 via pins 104, 106, respectively. Wedge 96 includes a first end 108 including an opening 110 for pin 104, a second end 112, and sidewalls 114, 116 extending between first and second ends 108, 112. Wedge 98 further includes a stud opening 118 for receiving stud 60 therethrough and a stud groove 120 for engaging post 78 of stud 60 when stud 60 extends through wedge 98. Wedge 98 further includes a tapered section 121 that includes a first taper 122 and a second taper 124 extending down from first end 108.

Linkage arm 100 includes a main plate 126 including a first end 127 with an opening 128 for receiving pin 104 and a second end 129 having a slot or elongated opening 130 for receiving pin 106. Linkage arm 100 further includes first and second linkage arm connectors 132, 134 each having a biasing plate 136 for biasing die spring 102 therebetween, an end plate 137 including an opening 138 aligning with opening 128 and slot 130, respectively, in main plate 126 and a slot 139 configured to receive first and second ends 127, 129, respectively, of main plate 126.

Pin 104 extends through opening 138 in first linkage arm connector 132, opening 110 in wedge 98, and opening 128 in main plate 126. Handle 30 includes a first handle pin opening 140 for receiving pin 106. Thus, pin 106 extends through first handle pin opening 140, opening 138 is second linkage arm connector 134, and slot 130 in main plate 126. Handle 30 further includes a second handle pin opening 142 for receiving pin 33 therethrough.

Figure 7:
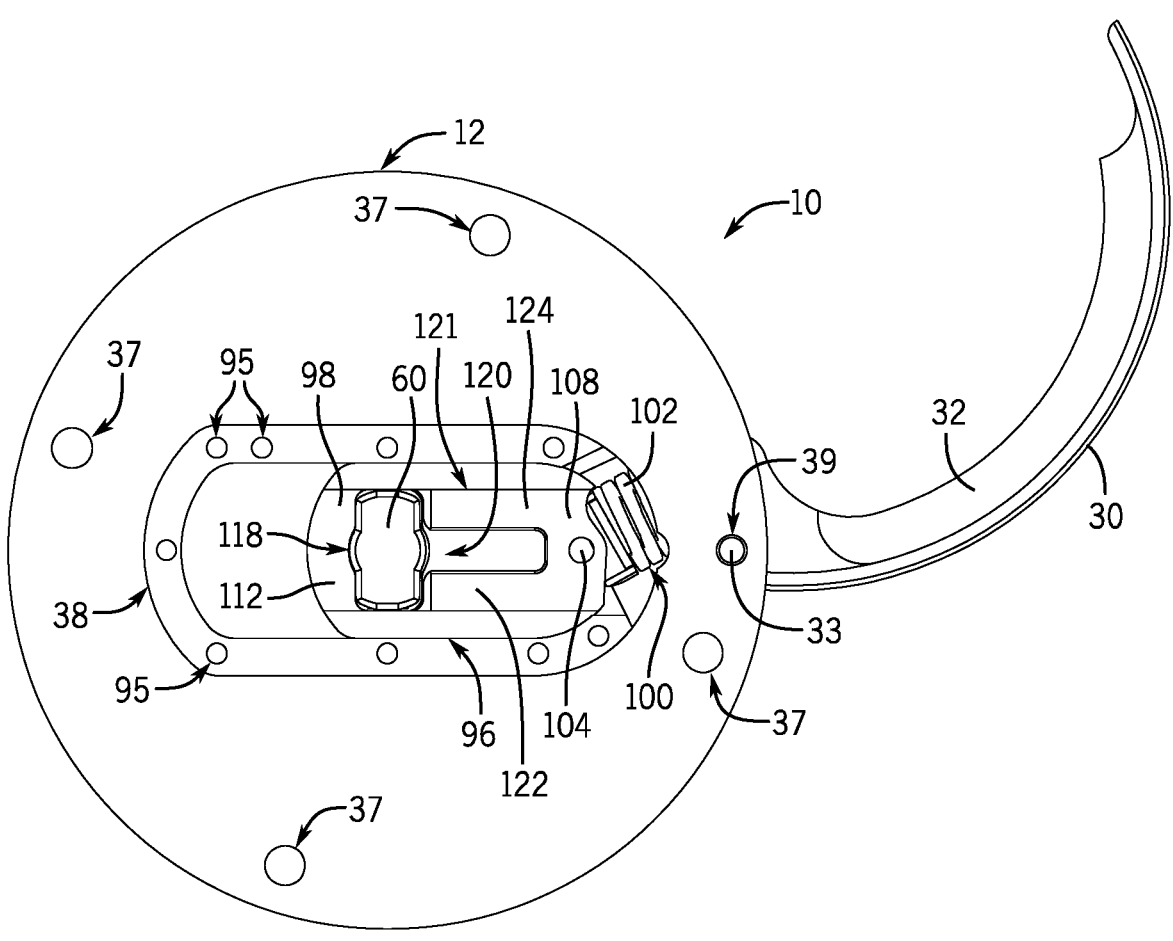
FIGS. 7 and 8 are top views of the portable section of the connecting mechanism of FIGS. 1 and 2 with a stud of the base section of the connecting mechanism of FIGS. 1 and 2 extending therethrough and with the locking assembly in the unlocked and locked states, respectively, according to an embodiment of the invention.
Figure 9:
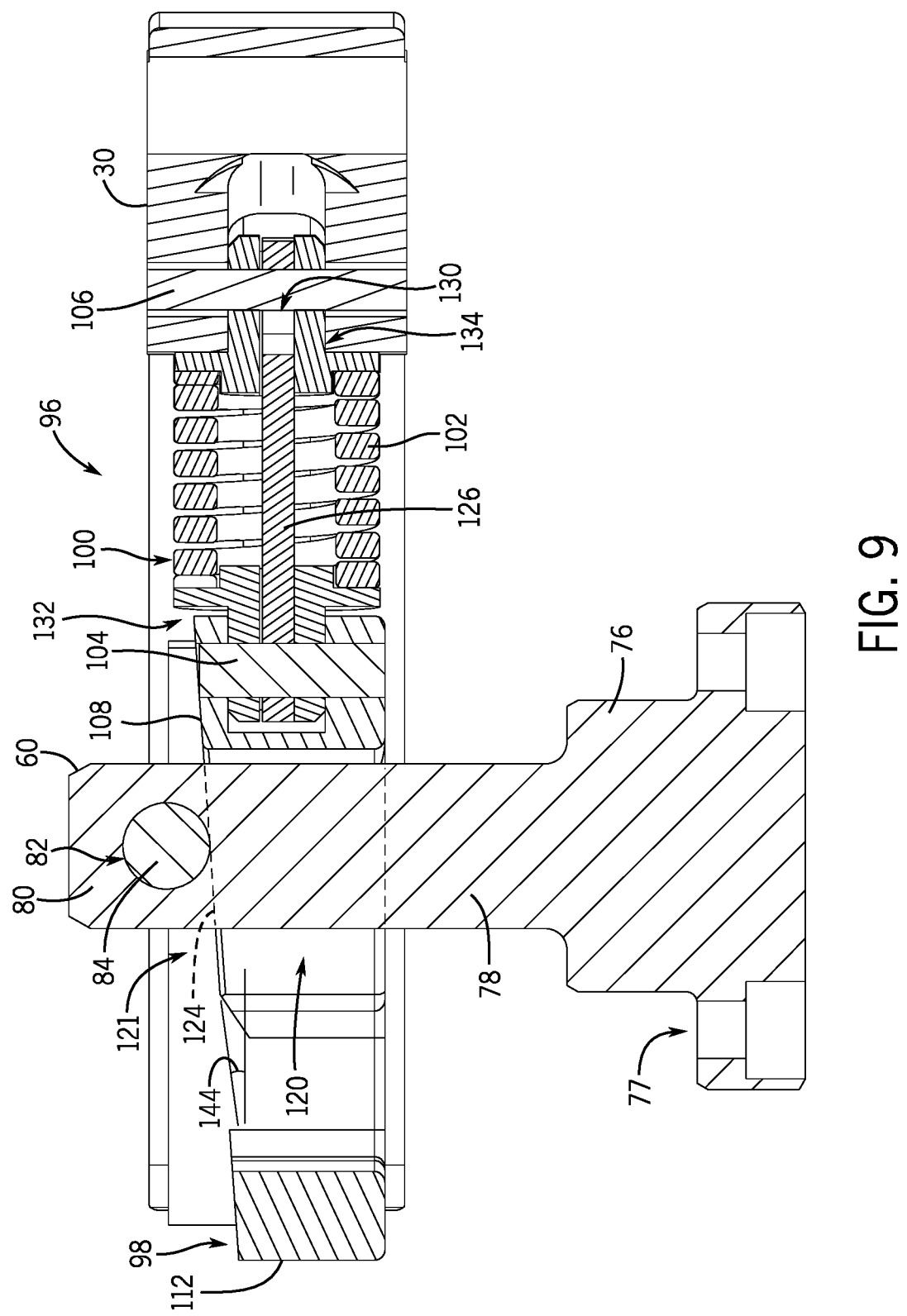
FIG. 9 is a side cross-sectional view of FIG. 8 taken at a post of the stud of the base section of the connecting mechanism of FIGS. 1 and 2, according to an embodiment of the invention.

Referring now to FIGS. 7-9, the operation of locking assembly 96 will be described. FIGS. 7 and 8 illustrate top views of portable section 14 of connecting mechanism 10 of FIGS. 1 and 2 with stud 60 of base section 12 of the connecting mechanism of FIGS. 1 and 2 extending therethrough and with locking assembly 96 in the unlocked and locked states, respectively, according to an embodiment of the invention. FIG. 9 is a side cross-sectional view of FIG. 8 taken at post 78 of stud 60 of base section 12 of connecting mechanism 10 of FIGS. 1 and 2, according to an embodiment of the invention. Initially, as shown in FIG. 7, when locking assembly 96 is in the unlocked state, handle 30 is in an unlocked position in which it extends away from housing 24 of portable section 14. Moving handle 30 to the unlocked position retracts tapered section 121 of wedge 98 within housing 24 and aligns stud 60 with stud opening 118 in wedge 98. Thus, when handle 30 is in the unlocked position to place locking assembly 96 in the unlocked state, portable section 14 may be detached or removed from base section 12 through stud opening 118 in wedge 98 and stud opening 88 in mounting plate 86 of housing 24.

Referring now to FIGS. 8 and 9, as handle 30 is moved to a locked position in which handle 30 is within recess 28 of sidewall 25 of housing 24 of portable section 14, linkage arm 100 rotates along an eccentric path until it locks in the position shown. This eccentric path is made possible by slot 130 in main plate 126. As shown in FIG. 9, when handle 30 is in the locked position, pin 106 moves within slot 130 such that die spring 102 is able to apply clamping pressure on wedge 98. In other words, the rotation of linkage arm 100 causes tapered portion 121 of wedge 98 to advance and engage roller bearing 84 in head 80 of stud 60, which is now positioned in groove 120 between tapers 122, 124. As most clearly shown in FIG. 9, head 80 of stud 60 has a taper matching that of tapers 122, 124, with roller bearing 84 extending through the taper to engage tapers 122, 124 on either side of post 78 of stud 60.

The locked state of locking assembly 96 shown in FIGS. 8 and 9 is due to eccentric path of linkage arm 100, the clamping pressure provided by die spring 102, and the tapered section of wedge 96 engaged with roller bearing 84 of stud 60. An angle 144 of tapers 122, 124 and of the taper of head 80 of stud 60 creates a self-locking taper. Generally, self-locking taper is less than seven (7) degrees. In a non-limiting embodiment, angle 144 is four (4) degrees. The exact clamping pressure is determined by the configuration of wedge 98 and die spring 102. As a non-limiting example, in various embodiments, die spring 102 provides a clamping pressure of five hundred (500) pounds.

In this precise configuration, when locking assembly 96 is in the locked state, the self-locking taper and clamping pressure will not allow wedge 98 to retract. In fact, due to the precision of the configuration vibrations will make the lock between components tighter and connecting mechanism 10 is extremely rigid. Thus, the strength of connecting mechanism 10 depends on the shear strength of stud 60, which will allow connecting mechanism 10 operate with a high holding pressure. As a non-limiting example, in various embodiments, the holding pressure may be twenty thousand (20,000) pounds. Further, even when switching between the locked state and the unlocked state, the precise engagement between stud 60 and wedge 98 will not deteriorate quickly. That is, at most, tapered section 121 of wedge 98 may lose microns of distance between stud 60 in groove 120 and first end of wedge 98. As such, connecting mechanism 10 provides a durable and reliable connection for an object, machine, etc. mounted thereon.

Figure 10:
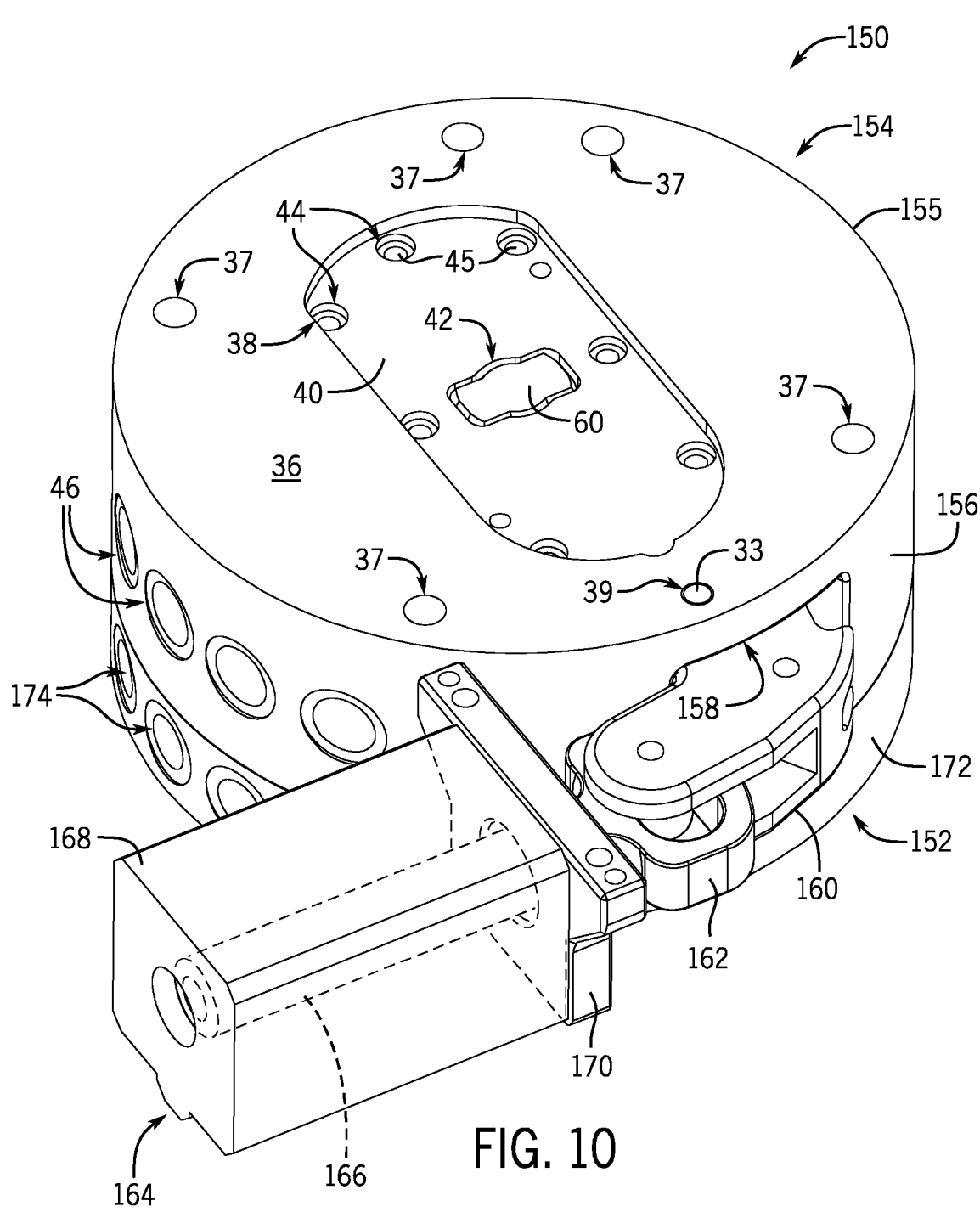
FIG. 10 is a top perspective view of a connecting mechanism, according to another embodiment of the invention.

FIG. 10 is a top perspective view of a connecting mechanism 150, according to another embodiment of the invention. Connecting mechanism 150 includes many of the same components as connecting mechanism 10, and, as such, like elements will be numbered the same. Connecting mechanism 150 provides for pneumatic operation of locking assembly 96, as described below. Connecting mechanism 150 includes a first or base section 152 and a second or portable section 154. Portable section 154 includes a sidewall 156 and opening 158 for a handle or lever 160 actuated via a pneumatic system. Handle 160 is coupled to linkage 162 which, in turn, couples handle 160 to a pneumatic cylinder 164 with a pneumatic piston 166 in a housing 168. Pneumatic cylinder 164 may be activated such that piston 166 actuates handle 160 and, therefore, locking assembly 96. Base section 152 includes an alternative configuration without a mounting surface around a housing 172, as described briefly above. Base section 152 includes connection openings 174 equivalent to connection openings 54 of connection section 52 of base section 12.

Figure 11:
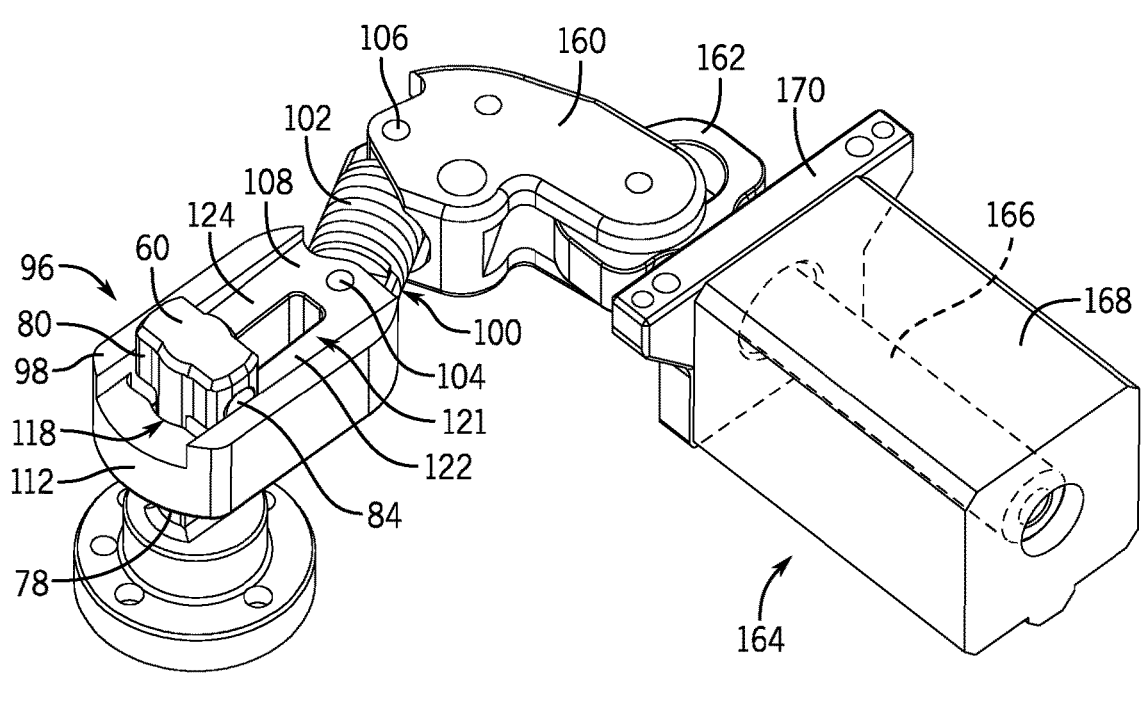
FIGS. 11 and 12 are top perspective view showing the pneumatic operation of a locking assembly of the connecting mechanism of FIG. 10, according to an embodiment of the invention.
Figure 12:
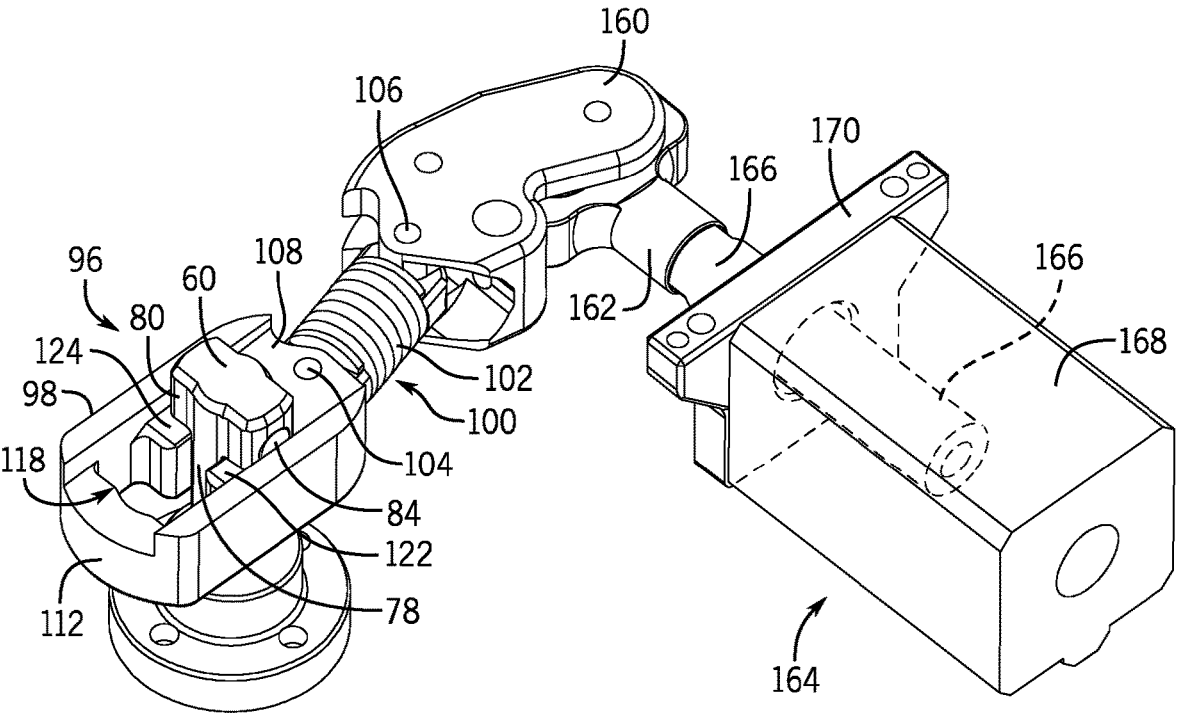

FIGS. 11 and 12 are top perspective view showing the pneumatic operation of a locking assembly of the connecting mechanism of FIG. 10, according to an embodiment of the invention. In FIG. 11, locking assembly 96 is in the locked state with piston 166 mostly inside housing 168. In FIG. 12, locking assembly 96 is in the unlocked state with piston 166 extending out of housing 168 in order to actuate handle 160. Other than the pneumatic operation of locking assembly 96, the locking and unlocking operation of locking assembly 96 is the same.

Beneficially embodiments of the invention thus provide a connecting mechanism includes a first or base section and a second or portable section that is engageable with the base section. The base section includes a housing and a stud mounted within the housing and having a roller bearing. The portable section includes a housing configured to receive the stud therethrough. Within the housing is a locking assembly is configured to lock the base section to the portable section when the base and portable sections are engaged and an unlocked state configured to allow the portable section to engage with or disengage from the base section. The locking assembly includes a wedge configured to receive the stud therethrough and having a tapered section with a forked taper configured to engage roller bearing of the stud. The locking assembly also includes a linkage arm coupling the wedge to a handle that extends through the housing. The handle is actuatable between a locked position configured to place the locking assembly in the locked state by advancing the tapered section of the wedge to engage the roller bearing of the stud and an unlocked position configured to place the locking assembly in the unlocked state by retracting the tapered section of the wedge.

The configuration of the locking assembly provides a precise and reliable connection for an object or machine mounted on the connecting mechanism. Further, the actuation of the handle to switch between the locked and unlocked states provides a quick and easy method of actuation. Thus, a user can easily disconnect the portable section for transfer to another area or base section and transfer it back as well. The strength of the connecting mechanism is due to a self-locking taper in combination with clamping pressure from the die spring and the holding pressure provided by the stud.

Therefore, according to one embodiment of the invention, a connecting mechanism includes a first section and a second section engageable with the first section. The first section includes a stud having a roller bearing. The second section includes a housing configured to receive the stud therethrough and a locking assembly positioned within the housing and actuatable between a locked state configured to lock the first section to the second section when the first and second sections are engaged and an unlocked state configured to allow the second section to engage with or disengage from the first section. The locking assembly includes a wedge configured to receive the stud therethrough and including a tapered section, a linkage arm including a first end engaging the wedge and a second end, and a die spring positioned on the linkage arm between the first and second ends thereof. The locking assembly also includes a handle engaging the second end of the linkage arm and the housing and actuatable between a locked position configured to place the locking assembly in the locked state by advancing the tapered section of the wedge to engage the roller bearing of the stud and an unlocked position configured to place the locking assembly in the unlocked state by retracting the tapered section of the wedge.

According to another embodiment of the present invention, a method of manufacturing a connecting mechanism including a first section and a second section engageable with the first section includes constructing the first section by providing a stud including a roller bearing. The method further includes constructing the second section by providing a housing configured to receive the stud therethrough and assembling, within the housing, a locking assembly actuatable between a locked state configured to lock the first section to the second section when the first and second sections are engaged and an unlocked state configured to allow the second section to engage with or disengage from the first section. Assembling the locking assembly includes engaging, with the housing, a handle configured to actuate between a locked position corresponding to the locked state of the locking assembly and an unlocked position corresponding to the unlocked state of the locking assembly. Furthermore, assembling the locking assembly includes engaging, with the handle, a first end of a linkage arm having a die spring positioned thereon and engaging, with a second end of the linkage arm, a wedge configured to receive the stud therethrough and including a tapered section configured to advance to engage the roller bearing of the stud when the handle is actuated to the locked position and configured to retract when the handle is actuated to the unlocked position.

According to yet another embodiment of the present invention, a locking assembly for a connecting mechanism includes a wedge configured to receive a stud therethrough and having a tapered section, a linkage arm with a first end configured to engage the wedge and a second end, and a die spring constructed to fit to on the linkage arm between the first and second ends thereof. In addition, the locking assembly includes a handle configured to engage the second end of the linkage arm and actuatable between a locked position configured to place the locking assembly in a locked state by advancing the tapered section of the wedge and an unlocked position configured to place the locking assembly in an unlocked state by retracting the tapered section of the wedge.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A connecting mechanism comprising:
a first section comprising a stud having a roller bearing; and
a second section engageable with the first section, the second section comprising:
a housing configured to receive the stud therethrough; and
a locking assembly positioned within the housing and actuatable between a locked state configured to lock the first section to the second section when the first and second sections are engaged and an unlocked state configured to allow the second section to engage with or disengage from the first section, the locking assembly comprising:
a wedge configured to receive the stud therethrough and comprising a tapered section;
a linkage arm comprising a first end engaging the wedge and a second end;
a die spring positioned on the linkage arm between the first and second ends thereof; and
a handle engaging the second end of the linkage arm and the housing and actuatable between a locked position configured to place the locking assembly in the locked state by advancing the tapered section of the wedge to engage the roller bearing of the stud and an unlocked position configured to place the locking assembly in the unlocked state by retracting the tapered section of the wedge.

2. The connecting mechanism of claim 1 wherein:
the linkage arm of the locking assembly comprises:
a main plate comprising an opening at a first end and a slot at a second end; and
first and second linkage arm connectors engaged with the main plate at the respective first and second ends of the main plate, each of the first and second connectors comprising:
a biasing plate;
an end plate extending from the biasing plate to define the first or second end of the linkage arm and comprising an opening aligned with the opening or the slot of the main plate; and
a slot extending through the biasing plate and the end plate and receiving the first or second end of the main plate;
the die spring is positioned on the main plate of the linkage arm between the first and second connectors;
the linkage arm engages the wedge at its first end via a first pin extending through the opening in the end plate of the first linkage arm connector, an opening in the wedge, and the opening in the main plate; and
the linkage arm engages the handle at its second end via a second pin extending through the opening in the end plate of the second linkage arm connector, an opening in the handle, and the slot in the main plate.

3. The connecting mechanism of claim 1 wherein the linkage arm is configured to rotate in an eccentric path upon actuation of the handle.

4. The connecting mechanism of claim 1 wherein:
the stud comprises:
a post having a first end and a second end; and
a head at the first end of the post, the head comprising a roller bearing opening; and
the roller bearing is positioned within the roller bearing opening.

5. The connecting mechanism of claim 4 wherein:
the tapered section of the wedge comprises a first taper and a second taper forming a stud groove therebetween;
the stud groove is configured to receive the post of the stud; and
the first and second tapers are configured to engage the roller bearing positioned in the head of the stud.

6. The connecting mechanism of claim 4 wherein the stud further comprises a base with a stepped configuration at the second end of the post.

7. The connecting mechanism of claim 4 wherein:
the head of the stud has a tapered section matching the tapered section of the wedge; and
the roller bearing extends through the tapered section of the head of the stud.

8. The connecting mechanism of claim 1 wherein:
the housing of the second section comprises:
a first surface comprising a main opening; and
a second surface opposite the first surface and comprising a stud opening;
the second section further comprises a cover plate coupled to the housing of the second section within the main opening of the first surface and comprising a stud opening; and
when the second section engages the first section, the stud extends through the stud opening in the second surface of the housing, through the wedge, and through the stud opening in the cover plate.

9. The connecting mechanism of claim 1 wherein:
the handle comprises an elongated projection extending at least partially along a length of the handle; and the housing of the first section comprises a recess having a groove configured to receive the elongated projection of the handle therein.

10. The connecting mechanism of claim 1 wherein the first section further comprises:

a housing in which the stud is mounted; and a mounting surface adjacent the housing and configured to mount the first section to a surface independent of the connecting mechanism.

11. A method of manufacturing a connecting mechanism, the method comprising:

constructing a first section by providing a stud comprising a roller bearing; and constructing a second section engageable with the first section by:

providing a housing configured to receive the stud therethrough; and assembling, within the housing, a locking assembly actuatable between a locked state configured to lock the first section to the second section when the first and second sections are engaged and an unlocked state configured to allow the second section to engage with or disengage from the first section, assembling the locking assembly comprising:

engaging, with the housing, a handle configured to actuate between a locked position corresponding to the locked state of the locking assembly and an unlocked position corresponding to the unlocked state of the locking assembly;

engaging, with the handle, a first end of a linkage arm having a die spring positioned thereon; and engaging, with a second end of the linkage arm, a wedge configured to receive the stud therethrough and comprising a tapered section configured to advance to engage the roller bearing of the stud when the handle is actuated to the locked position and configured to retract when the handle is actuated to the unlocked position.

12. The method of claim 11 further comprising coupling a cover plate within a main opening in the housing, the cover plate comprising a stud opening configured to receive the stud therethrough.

13. The method of claim 11 further comprising engaging the first section and the second section by inserting the stud through the housing of the first section and through the wedge of the locking assembly.

14. The method of claim 11 wherein assembling the locking assembly further comprises arranging the linkage arm to rotate in an eccentric path upon actuation of the handle.

15. The method of claim 11 wherein constructing the first section further comprises mounting the stud within a housing of the first section.

16. A locking assembly for a connecting mechanism, the locking assembly comprising:

a wedge configured to receive a stud therethrough and comprising a tapered section;

a linkage arm comprising:

a first end configured to engage the wedge and a second end;

a main plate comprising an opening at a first end and a slot at a second end; and first and second linkage arm connectors configured to engage with the main plate at the respective first and second ends of the main plate, each of the first and second connectors comprising:

a biasing plate;

an end plate extending from the biasing plate to define the first or second end of the linkage arm and comprising an opening aligned with the opening or the slot of the main plate; and a slot extending through the biasing plate and the end plate and configured to receive the first or second end of the main plate;

a die spring constructed to fit to on the linkage arm between the first and second linkage arm connectors;

a handle configured to engage the second end of the linkage arm and actuatable between a locked position configured to place the locking assembly in a locked state by advancing the tapered section of the wedge and an unlocked position configured to place the locking assembly in an unlocked state by retracting the tapered section of the wedge;

wherein the linkage arm is configured to:

engage the wedge at its first end via a first pin configured to extend through the opening in the end plate of the first linkage arm connector, an opening in the wedge, and the opening in the main plate; and engage the handle at its second end via a second pin extending through the opening in the end plate of the second linkage arm connector, an opening in the handle, and the slot in the main plate.

17. The locking assembly of claim 16 wherein the tapered section of the wedge comprises a self-locking taper.

18. The locking assembly of claim 17 wherein the self-locking taper has an angle of four degrees.

19. The locking assembly of claim 16 wherein the tapered section of the wedge comprises a first taper and a second taper forming a stud groove therebetween.

* * * * *